(12) United States Patent
Buabbud et al.

(10) Patent No.: US 6,366,712 B1
(45) Date of Patent: Apr. 2, 2002

(54) APPARATUS AND METHOD FOR COMBINING TWO SEPARATE RF SIGNALS ON A SINGLE OPTICAL FIBER WITH MONITORING AND ALARM CAPABILITIES

(75) Inventors: George H. Buabbud, South Lake; Georgeanne M. Radloff, Grand Prairie; Muneer Zuhdi, Lewisville, all of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/540,956

(22) Filed: Mar. 31, 2000

(51) Int. Cl.[7] .................................................. G02B 6/26
(52) U.S. Cl. ............................... 385/15; 385/24; 385/2; 725/68; 345/719

(58) Field of Search .............................. 385/15, 24, 2; 348/731; 725/68; 345/719

(56) References Cited

U.S. PATENT DOCUMENTS

| 5,199,086 A | * | 3/1993 | Johnson et al. |
| 5,644,268 A | * | 7/1997 | Hang |
| 5,752,180 A | * | 5/1998 | Guo et al. |
| 5,982,165 A | * | 11/1999 | Bowyer et al. |

* cited by examiner

Primary Examiner—Hung N. Ngo
(74) Attorney, Agent, or Firm—Jones, Day, Reavis & Pogue

(57) ABSTRACT

Apparatus for combining an RF signal at one frequency band and carried by a selected nominal wavelength of light with a RF signal at a different and separate frequency band and carried by another source of light having the selected nominal wavelength onto a signal optical fiber.

11 Claims, 3 Drawing Sheets

APPARATUS AND METHOD FOR COMBINING TWO SEPARATE RF SIGNALS ON A SINGLE OPTICAL FIBER WITH MONITORING AND ALARM CAPABILITIES

BACKGROUND OF THE INVENTION

1. Field of the Invention

The present invention relates to methods and apparatus for using optical fibers as communication transmission paths, and more specifically to the combining of two separate RF signals such as CATV signals and Direct Broadcast Satellite (DBS) signals on a single optical fiber. The invention is also related to at least partially substantially controlling the apparatus.

2. Description of Related Art Including Information Disclosed Under 37 CFR 1.97 And 1.98

The communication industry is using more and more optical or light fibers in lieu of copper wires since optical fibers have substantially greater bandwidth than traditional copper wires or cables. For example, in addition to bidirectional telephone signals, systems are now coming on-line which use a single optical fiber to transmit cable TV, (Community Antenna TV commonly referred to as CATV) signals along with the bidirectional telephone signals. In a typical installation, the bidirectional telephone signals will be transmitted as Time Compressed Multiplexed (TCM) signals which modulate light having a nominal light wavelength of about 1310 nanometers, and the unidirectional TV or RF signals are used to modulate light having a wavelength of about 1550 nanometers. The two wavelengths of light are then combined by an optical coupler such as by Wave Dimension Multiplexing (WDM) onto a single optical fiber. This approach works well, but there are ever increasing demands for other types of communication techniques. For example, Direct Broadcast Satellite (DBS) is now available and provides a digital TV signal which is typically coded and compressed and consequently is much less subject to degradation and interference by noise signals. It is now desirable to provide DBS signals to the home other than by an individual satellite dish. To date, there is no effective and acceptable commercial method of such signal distribution other than by dedicated cables.

Unfortunately, some of the equipment necessary for such systems can be extremely expensive, complex and sensitive. Consequently, the task of continuously controlling and monitoring such equipment is very important if the equipment is to be dependable.

SUMMARY OF THE INTENTION

Therefore, it is an object of the present invention to provide acceptable and effective commercial methods and apparatus for combining two separate RF signals onto a single optical fiber.

It is another object of the present invention to provide a direct RF signal to a modulated light converting system which is easy to troubleshoot and repair by providing indications and alarms in the event of failure or poor performance.

These and other objects are achieved by the apparatus of this invention which comprises a first optical fiber for providing light at a selected nominal wavelength. The provided light is modulated by an RF signal such as for example a cable TV signal having a frequency in the range of 50 MHz to 870 MHz. The nominal wavelength of light used for carrying the RF signal is typically on the order of 1556 nanometers. A direct RF signal such as a Digital Broadcast Satellite (DBS) signal which is typically received by a satellite dish is also made available and will typically have a frequency band of between 950 and 2050 MHz. It is seen that there is at least 80 MHz separation between the two RF signals. (950–870). The RF signal is then passed through a high pass filter which is designed to readily pass signals having a frequency within the frequency band of the RF signal and which eliminates or substantially reduces signals which are in the frequency band of the previously discussed CATV RF signal. The digital DBS signal leaving the high pass filter is then provided to an optical light generator which generates and directs light onto a second optical fiber at a second wavelength, having a nominal value of 1548 nanometers. The filtered digital DBS signal is used to modulate this generated light. Although it may be possible to use various types of optical light generators, a Distributed Feedback Bragg (DFB) laser is particularly suitable for the present invention because of its very narrow bandwidth. The two optical fibers carrying the CATV RF signal and the DBS RF signal are then provided to an optical coupler which is selected to provide a combined output on a third optical fiber. The optical coupler is selected such that more than 50% of the combined light output is provided by the first optical fiber and should have a first selected percentage such as, for example, between about 55% and 80% and preferably about 70%. The first optical fiber carries the CATV RF signal. The second optical fiber which is carrying the DBS RF signal provides a second selected percentage of between about 45% and 20% of the combined light and preferably about 30%. These experimentally determined percentages have been found to be of significant importance because of the high susceptibility of the CATV RF signals to noise and spurious other signals. In a preferred arrangement, the DBS RF signal will be approximately 6 dB less than the CATV RF signal and the two signals will be separated by about 6–10 nanometers.

The system further includes circuitry for monitoring the optical signal and the DBS RF signal and sending alarms when these signals deviate from preset limits.

BRIEF DESCRIPTION OF THE DRAWINGS

These and other features of the present invention will be more fully disclosed when taken in conjunction with the following Detailed Description of the Invention in which like numerals represent like elements and in which.

DETAILED DESCRIPTION OF THE INVENTION

Figure 1:
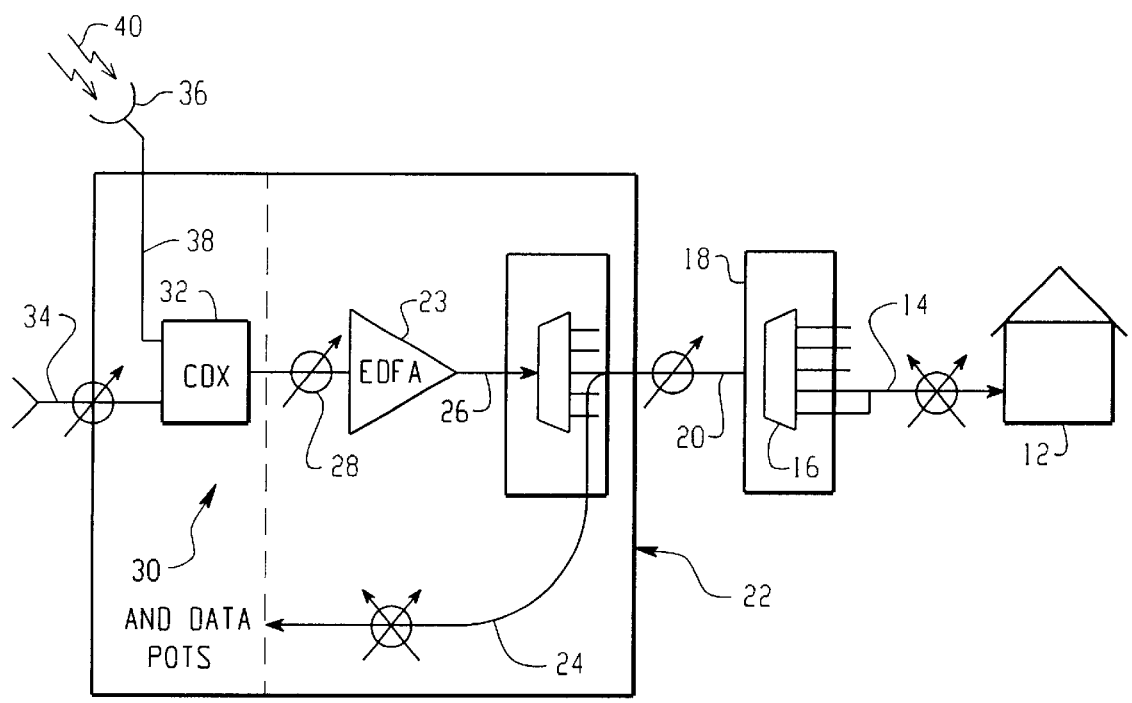
FIG. 1 is an overall block diagram of an optical communication system using light waves combined according to the teachings of this invention to transmit at least two types of RF signals along with bidirectional telephone signals on a single optical fiber.

Referring now to FIG. 1, there is shown generally at 10 an optical communication system incorporating the features of the present invention. Although the following description represents a typical installation from end to end for transmitting both RF signals and bidirectional telephone signals to the home, other distribution techniques which may include partially wire conductors would also be included in the scope of the present invention. As shown, a home 12 is connected to a single optical fiber 14 which extends from the home 12 to a distribution box 16 which includes a splitter 18 such as, for example, a 1×4 splitter for providing similar optical fibers to other homes. Splitter 18 receives a single optical fiber 20 from a central office 22. As shown, the optical fiber 20 is used to transmit the signal to an ultimate destination such as the building or home of an end user 12. In the event the building or home 12 is in close proximity to the central office 22, the light waves might well be of sufficient power to require no further amplification. However, it is typically that one or more amplification stations will be necessary along the path of the light transmission cables to assure signals of sufficient strength to a multiplicity of customers at various locations along with path. Therefore, as shown in FIG. 1, there is included light amplification apparatus 23. Light amplification apparatus 23 includes a light amplification pump such as an EDFA (erbium doped fiber amplifier) as well as various monitors and switches. In addition to the light amplification apparatus 23, the central office 22 will include presently available optical combining circuit such as Wave Division Multiplexing for combining light waves having a frequency of about 1310 nanometers commonly used for bidirectional telephone signals and initially received on an optical fiber 24, with light typically having a nominal wavelength of between about 1540 and 1560 nanometers initially received on optical fiber 26. The light provided by fiber 26 and having a wavelength of around 1556 nanometers is typically used to provide RF CATV signals having a frequency of about 50–870 MHz. However, The fiber optic cable 26 carrying the nominal 1548 nanometer wavelength of light will also carry digital RF signals having a bandwidth of between 950 and 2050 MHz when the teachings of the present invention are used with such a transmission system. The nominal 1548 and 1556 nanometer light carrying both the digital and analog RF signals is provided by the apparatus of the present invention on optical fiber 28. As shown, the CATV, DBS transmitter (CDX) apparatus 32 of the present invention receives the typically and presently available CATV signal on optical fiber 34 as one input while at the same time receiving the RF signal from a satellite dish 36 on a coax cable 38 as a second input.

Figure 2:
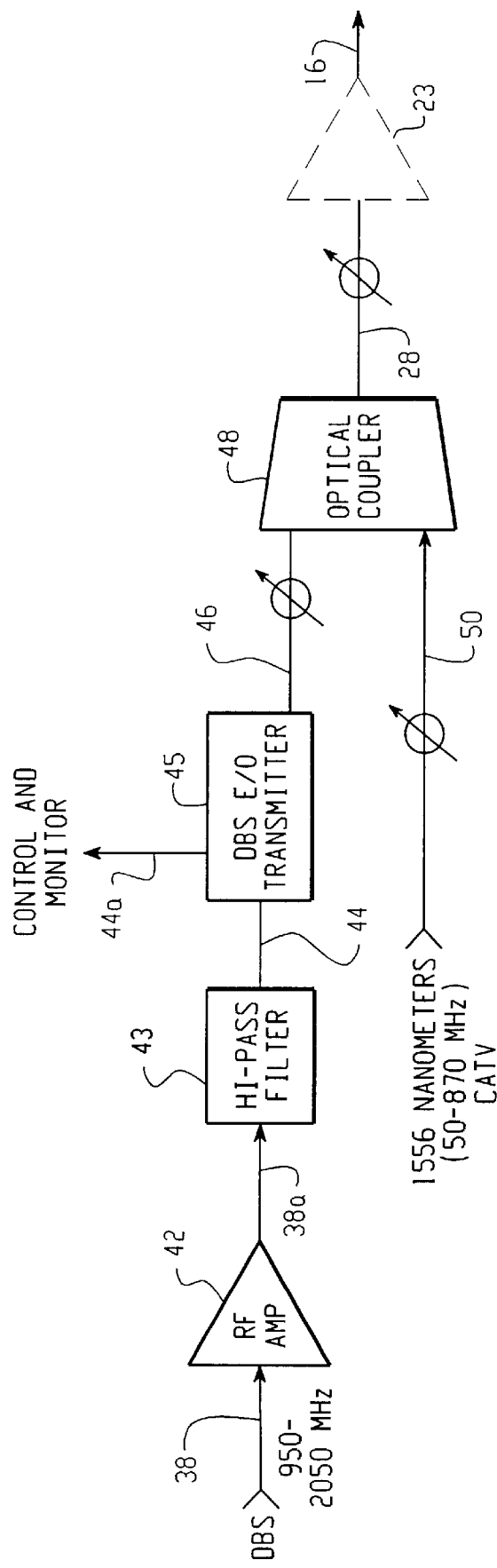
FIG. 2 is a block diagram of apparatus for combining an analog RF signal and a digital RF signal incorporating the teachings of the present invention.

Referring now to FIG. 2, the system 30 of the present invention will be discussed. As shown, the satellite signals 40 are collected by satellite dish 36 and provided to amplifier circuit 42 by means of a pair of copper wires such as, for example, a coax cable 38. Amplifying circuit 42 provides an overall amplification factor of about 20 dB of the DBS RF signal on coax cable 38a to a high pass filter 43. High pass filter 43 is selected to readily pass signals having a frequency within the frequency band of the DBS RF signals (such as, for example, between 950 MHz to 2050 MHz) and to eliminate or substantially reduce any signal having a frequency less than about 870 MHz. Thus, the filter rolls off from a point which allows maximum signal transmission or passage at about 950 MHz to a minimum transmission level at about 870 MHz which is in the high range of a cable CATV signal to be discussed alter. Thus, it will be appreciated at this point the filtered output signal on line 44 should be carrying minimum noise or other spurious signals below 870 MHz which might affect the CATV signals after the analog and digital signals are combined. The filtered RF signal on line 44 is then provided to an E/O (electrical to optical) converter 45 or transmitter, and on line 44a to automatic control circuitry to be discussed later. The E/O converter 45 generates light having a nominal wavelength of about 1548 nanometers and which light is modulated by the filtered RF signal. Although various types of optical light generators could be used, a Distributed Feedback Bragg (DFB) laser is specifically suited for the present invention because of the narrow bandwidth. Thus, there is provided an output on optical fiber 46 which is carrying light at a nominal wavelength of 1548 nanometers and which is modulated by the digital RF signal having a frequency band of between 950 and 2050 MHz. Optical fiber 46 is connected to one input or port of an optical coupler 48 such as, for example, a wavelength flattened coupler. A second optical fiber 50 carrying analog CATV signals also at a nominal frequency of about 1556 nanometers and which light is modulated by the RF signals within a bandwidth of between about 50 MHz and 870 MHz is connected to a second input or port of the optical coupler 48. The combined outputs of two optical signals are then provided as an output from a third port to a third optical output fiber 28. It is important to note, however, that to avoid interference between the two input signals on fiber optics 46 and 50 they cannot be indiscriminately coupled. It has been discovered that the optic coupler should be selected such that the output light on fiber 28 is comprised of between about 45% and 80% and preferably about 70% light from the CATV signals with a corresponding preferable 30% from the DBS signals.

It is believed that these values provide effective coupling and that when the combined optical output on fiber 28 is input to the fiber amplifier, each signal will experience gain proportional to its wavelength and power level. The spectral uniform gain of the fiber amplifier is accounted for in deciding what relative power levels the two optical signals are transmitted, and at what wavelength. Using the 300% power input proportion of the digital DBS 950–2050 MHz signal carried at about 1548 nanometers on fiber 46 and the 70% power input proportion of the CATV 50–870 MHz signal carried at about 1556 nanometers on fiber 50, each signal will experience gain proportional to its wavelength and relative power. Following amplification, the energy will be contributed to each signal such that the CATV signal quality is optimized and the adjacent more robust DBS signal is maintained.

Figure 3:
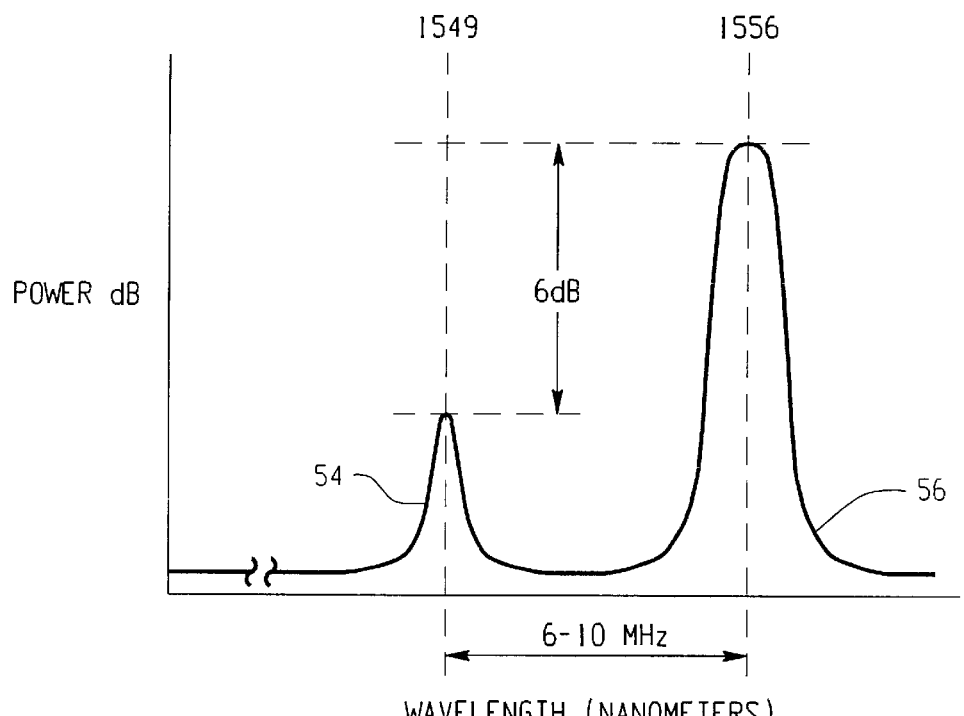
FIG. 3 shows the optical power spectrum of light wavelength around the 1550 nanometer range of the CDX.

Now referring to FIG. 3, there is shown typical signals (power versus wavelength) of the resulting digital DBS signal 54 carried at about 1549 nanometers and the CATV signal 56 carried at about 1556 nanometers at the output part of the optical coupler 48. As shown, there is about a 6dB delta between the two signals. Also as indicated there is a spacing of about 6–10 nanometer spacing between the signals with clear separation and no interference.

Figure 4:
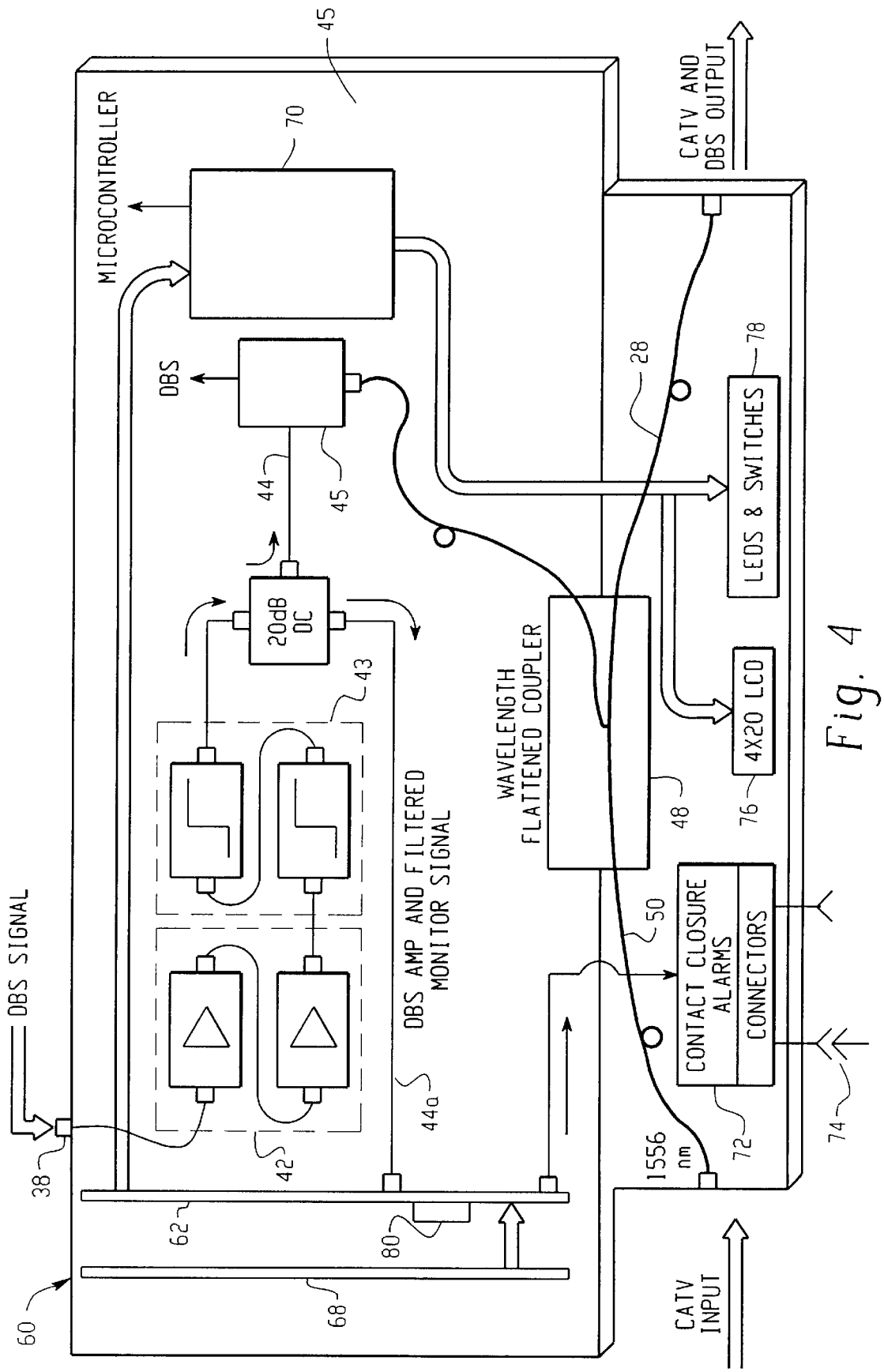
FIG. 4 is a block diagram showing another embodiment of the invention and further including the control and monitoring features according to an embodiment of the invention.

Referring now to FIG. 4, there is shown a block diagram of the CDX circuitry and optical device 60 for automatically monitoring the system apparatus as discussed above. Components of the apparatus common to the embodiment of FIG. 2 and FIG. 4 carry the same reference numbers. This embodiment also illustrates, for example, whereas FIG. 2 shows a single amplifier 42 and a single filter 43, FIG. 4 shows that these components could be a two step amplifier and a two step filter respectively. As shown, an RF monitor input on cable 44a to the interface board 62 of circuitry 60 allows detection and more detailed monitoring of the DBS signals that modulate the optical input signal and the parameters needed for amplification. As shown, interface board 62 provides communications between the various components of the apparatus 60. In the embodiment shown, the electrical power supply 68 which is used to drive the system circuitry is connected through interface board 62. Likewise, microcontroller circuitry 70 is also in communication with interface board 62 as is the power supply and alarms panel shown at reference number 72. Although as shown as a single panel, the power supply and alarms panel 72 could be two separate panels. It will also be appreciated that alarms panel 72 may also include a communication link 74 to a control center (not shown) such as, for example, a modem and a telephone line.

In addition to being connected to interface board 62, microcontroller circuitry 70 is further connected to the LCD display module 76 and the light indicators 78 (preferably an LED). As was mentioned earlier, the present apparatus is intended to operate substantially in an automatic mode and therefore is carefully controlled by the microcontroller board 70. To achieve such control, various types of sensors may be located throughout the apparatus. For example, there is shown peak detection circuitry 80 for monitoring the RF peak input power level on line 44a. To achieve such automatic control, the microcontroller circuitry 70 includes a flash memory or EPROM (erasable programmable read only memory) 82 which is used to store a program in firmware for such monitoring. The firmware will continuously monitor the RF signals and the optical carrier. The firmware will also provide alarms when the monitored signals deviate from present threshold levels. The term firmware is used to be distinguished from software in that the program is loaded into a read only solid-state memory rather than a read write memory.

The corresponding structures, materials, acts, and equivalents of all means or step plus function elements in the claims below are intended to include any structure, material, or act for performing the function in combination with other claimed elements as specifically claimed.

What is claimed is:

1. Apparatus for combining two signals having separate RF frequency bands on a single optical transmission fiber comprising:

a first optical fiber for providing light at a selected nominal wavelength, said light on said first optical fiber being modulated by an analog RF signal having a first selected frequency band;

a digital RF signal having a second selected frequency band, said second selected frequency band being greater and separate from said first selected frequency band;

a high-pass filter for receiving said digital RF signal, said high-pass filter selected to readily pass signals having a frequency within said second selected frequency band and to substantially reduce signals having a frequency within said first selected frequency band;

an optical light generator connected to receive said filtered digital RF signal, said generator for providing light on a second optical fiber at said selected nominal wavelength modulated by said filtered digital RF signal; and an optical coupler connected to receive modulated light from each of said first and second optical fibers and to provide a combined output on a third optical fiber, having a first selected percentage of said combined light output being provided by said first optical fiber and a second selected percentage of said combined output light being provided by said second optical fiber.

2. The apparatus of claim 1 wherein said first optical fiber provides light at a nominal center wavelength of about 1550 nanometers and carries analog RF signals between about 50 MHz to about 870 MHz.

3. The apparatus of claim 2 wherein said digital RF signals have a frequency band of between about 950 MHz to about 2050 MHz.

4. The apparatus of claim 1 wherein said digital RF signals have a frequency band of between about 950 MHz to about 2050 MHz.

5. The apparatus of claim 3 wherein said high pass filter readily passes signals above about 900 MHz and substantially reduces signals having a frequency of less than 870 MHz.

6. The apparatus of claim 1 wherein said optical light generator produces light at about 1550 nanometers.

7. The apparatus of claim 3 wherein said optical light generator produces light at about 1550 nanometers.

8. The apparatus of claim 7 wherein said optical coupler provides a combined output of about 60% light from said first optical fiber and about 40% from said second optical fiber.

9. The apparatus of claim 1 and further comprising control and monitoring circuitry.

10. The apparatus of claim 9 wherein said circuitry monitors RF signals and optical signals.

11. The apparatus of claim 10 wherein said circuitry will generate and alarm when the signals deviate from threshold levels.

* * * * *